[17.]

A. CHARLES.

Improvement in Rubbers and Brushes.

No. 4,529. Reissued Aug. 29, 1871.

*Witnesses.*

P. Ludewig Koethen.

E. W. Keuthner

*Inventor:*

A. Charles

UNITED STATES PATENT OFFICE.

AUGUSTUS CHARLES, OF PITTSBURG, PENNSYLVANIA.

IMPROVEMENT IN RUBBERS AND BRUSHES.

Specification forming part of Letters Patent No. 113,258, dated April 4, 1871; reissue No. 4,529, dated August 29, 1871.

*To all whom it may concern:*

Be it known that I, AUGUSTUS CHARLES, of Pittsburg, in the county of Allegheny and State of Pennsylvania, have invented certain Improvements in Rubbers and Brushes for cleaning blackboards and for other purposes; and I do hereby declare the following to be a full, clear, and exact description of the same, reference being had to the accompanying drawing forming a part of this specification, in which—

Figure 1:
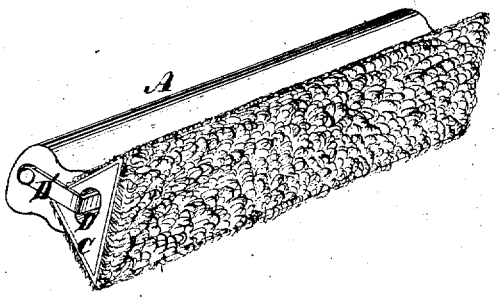
Figure 2:
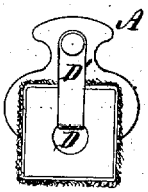
Figure 3:
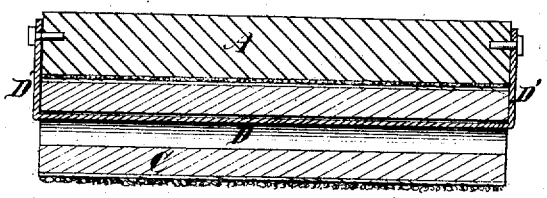

Figure 1 is a perspective view. Fig. 2 is an end view of modified form. Fig. 3 is a vertical longitudinal section.

This invention has relation to certain improvements in rubbers or brushes for cleaning blackboards, window-glass, mirrors, hats, clothes, and the like. It consists in forming the rubbing or brushing part of a several-sided block, covered on its working sides with sheep-skin, chamois, felt, plush, or other material which will answer the required purpose, and so attaching it to the handle that when the brushing or rubbing-surface of one side is worn out or otherwise rendered useless another side may be substituted equal to the first, and so on.

In the accompanying drawing, A represents a handle, in which is cut a longitudinal chamber or groove, B, to receive and hold the block C, as shown in Figs. 1 and 3. This block may be either triangular or quadrangular-shaped, and is covered with sheep-skin, felt, chamois, or any other suitable material by being glued thereto. D represents a hole bored lengthwise through the center of said block; and D′, an elastic strap, which is made to pass through it, and is attached at either end to the ends of the handle A. This strap holds the block and handle together and allows the position of the former to be changed when necessary.

I do not restrict myself to this or any other particular method of securing the block in place and allowing it to be turned. This instrument is simple and economical, and will last longer than the ordinary rubbers used for the same purpose in proportion to the number of its working sides.

What I claim as my invention, and desire to secure by Letters Patent, is—

A rubber or brush constructed with a series of faces, in combination with a handle, to which the same is suitably attached, so as to permit the rubber or brush to be rotated and present its working faces for use in succession, substantially as described.

A. CHARLES.

Witnesses:

I. LUDWIG KOETHER,

W. BEUTTMER.